(12) United States Patent
Goto et al.

(10) Patent No.: US 6,698,613 B2
(45) Date of Patent: Mar. 2, 2004

(54) OPENING STRUCTURE OF A FUEL TANK

(75) Inventors: Teijiro Goto, Toyota (JP); Tatsutoshi Takashima, Toyota (JP); Yojiro Iriyama, Toyoto (JP); Koji Sugiura, Toyoto (JP)

(73) Assignee: FTS Co., Ltd., Inazaula (JP)

( * ) Notice: Subject to any disclaimer, the term of this patent is extended or adjusted under 35 U.S.C. 154(b) by 118 days.

(21) Appl. No.: 10/107,185

(22) Filed: Mar. 28, 2002

(65) Prior Publication Data

US 2003/0029871 A1 Feb. 13, 2003

(30) Foreign Application Priority Data

Aug. 9, 2001 (JP) ........................................ 2001-242508
Jan. 31, 2002 (JP) ........................................ 2002-022738

(51) Int. Cl.$^7$ ............................................. B65D 88/12
(52) U.S. Cl. ..................... 220/562; 220/4.14; 220/659; 220/657
(58) Field of Search ................................ 220/562, 639, 220/657, 862, 4.14, 601, 900, 905

(56) References Cited

U.S. PATENT DOCUMENTS

| | | | | |
|---|---|---|---|---|
| 3,968,896 A | * | 7/1976 | Giacoletti et al. | 73/306 |
| 5,129,544 A | * | 7/1992 | Jacobson et al. | 220/562 |
| 5,330,068 A | * | 7/1994 | Duhaime et al. | 220/304 |
| 5,660,206 A | * | 8/1997 | Neal et al. | 137/592 |
| 6,332,555 B1 | * | 12/2001 | Stangier | 220/562 |
| 6,357,617 B1 | * | 3/2002 | Kido | 220/562 |
| 6,533,288 B1 | * | 3/2003 | Brandner et al. | 277/630 |
| 2002/0017527 A1 | | 2/2002 | Goto et al. | |

FOREIGN PATENT DOCUMENTS

| | | |
|---|---|---|
| JP | 61-83509 U | 6/1986 |
| JP | 4-7925 U | 1/1992 |
| JP | 2906701 B2 | 4/1999 |

* cited by examiner

Primary Examiner—Joseph Moy
(74) Attorney, Agent, or Firm—Burns, Doane, Swecker & Mathis, LLP (57) ABSTRACT

The present invention is directed to an opening structure of a fuel tank having a fuel tank wall made of plastic layers including at least an outer layer, an inner layer and an intermediate layer, with an opening portion formed to be integral with the fuel tank wall. The opening structure includes a cylindrical portion extended from the fuel tank wall outward thereof to form the opening portion, an overlapping portion extended from an end of the cylindrical portion to enlarge the diameter of the opening portion and bent at a bent portion to form an outer surface parallel with an opening end surface of the opening portion, and a compressed portion with at least a portion of the overlapping portion compressed in a direction perpendicular to the opening end surface of the opening portion. The opening structure further includes an annular member disposed around the opening portion to be in contact with the overlapping portion and the cylindrical portion, and at least a recessed portion for receiving therein a part of the outer layer to be integrally connected with the opening portion. The annular member has a step portion formed inward of the annular member in a radial direction thereof to contact with at least the compressed portion.

15 Claims, 14 Drawing Sheets

OPENING STRUCTURE OF A FUEL TANK

This application claims priorities under 35 U.S.C. Sec.119 to Nos.2001-242508 and 2002-022738 filed in Japan on Aug. 9, 2001 and Jan. 31, 2002, respectively, the entire contents of which are herein incorporated by reference.

BACKGROUND OF THE INVENTION

1. Field of the Invention

The present invention relates to an opening structure of a fuel tank, more particularly the opening structure of the fuel tank for use in an automotive vehicle. Also, the present invention relates to a method for producing the fuel tank by forming a fuel tank wall with a plurality of plastic layers through blow molding, and forming an opening portion to be integral with the fuel tank wall.

2. Description of the Related Arts

Recently, a fuel tank mounted on an automobile or the like is likely to be made from plastic material. For example, getting popular now is a method for forming a fuel tank by the plastic material through blow molding, and forming an opening portion to be integral with the fuel tank wall. As a result, a plastic fuel tank having an opening portion of a desired structure is getting popular. The structure of the opening portion of the fuel tank as described above is disclosed in Japanese Utility-model Laid-open Publication No.4-7925, for example. In FIG. 3 of that Publication, disclosed is a prior structure, and in FIG. 1, a proposed structure for restraining the height of an opening peripheral wall of the fuel tank. According to the Publication, it is described that engaging portions such as nuts are disposed on a base portion for mounting a cover member thereon, and engaging parts such as bolts are engaged with the engaging portions to secure the cover member to a fuel tank body, or fuel tank wall, so that a sufficient capacity can be obtained in a condition of a limited total height. Also disclosed in Japanese Patent No.2906701 is the structure similar to that disclosed in the above Publication as a prior art.

With respect to the plastic material forming the fuel tank, a plastic member having a plurality of layers is disclosed in Japanese Utility-model Laid-open Publication No.61-83509, for example. In this Publication, disclosed is a blow molded fuel tank with multiple layers, employing multiple plate members with a plurality of component plates adhered together through binding layers.

When the plastic made fuel tank is produced as disclosed in the above Publication No.61-83509, a plastic member having a plurality of layers is employed. This plastic member includes a strength holding member such as high density polyethylene for holding the strength of the fuel tank, a barrier member for protecting the fuel from passing through it, and binding material or the like for binding them. By forming that plastic member through a blow molding method, the fuel tank is produced, together with its opening portion formed simultaneously. When the opening portion is covered by the cover member as disclosed in the aforementioned Publication, the end surface of the opening portion with a plurality of layers may be exposed inside of the fuel tank. In this case, therefore, the fuel might be leaked from the strength holding member of the outermost layer of the plastic member. In the Publication No.4-7925 as described above, it is proposed to connect them by means of a connecting member such as a bolt or the like, with a packing disposed between them. When connecting the cover member with the fuel tank, however, the bolt and the packing of high sealing property will be needed. In this case, even if the packing with a good anti-passing property is employed, there might be caused the leak of fuel through the outermost layer of the plastic member.

Therefore, it is required to form an opening portion to prevent the fuel from passing through the plastic member at an opening portion of the fuel tank, effectively, and also required to connect an annular member engaged with a cover member, with the opening portion integrally.

SUMMARY OF THE INVENTION

Accordingly, it is an object of the present invention to provide an opening structure of a fuel tank having a fuel tank wall made of a plurality of plastic layers, to protect the fuel from passing through the plastic member at an opening portion of the fuel tank effectively, and connect an annular member with the opening portion integrally.

It is another object of the present invention to provide a method for forming a fuel tank wall with a plurality of plastic layers through blow molding, and forming an opening portion to be integral with the fuel tank wall, to produce a fuel tank having an opening structure to protect the fuel from passing through the plastic member effectively, and connect an annular member with the opening portion integrally.

In accomplishing the above and other objects, an opening structure of a fuel tank having a fuel tank wall made of plastic layers including at least an outer layer, an inner layer and an intermediate layer, with an opening portion formed to be integral with the fuel tank wall. The opening structure includes a cylindrical portion extended from the fuel tank wall outward thereof to form the opening portion, an overlapping portion extended from an end of the cylindrical portion to enlarge the diameter of the opening portion and bent at a bent portion to form an outer surface parallel with an opening end surface of the opening portion, and a compressed portion with at least a portion of the overlapping portion compressed in a direction perpendicular to the opening end surface of the opening portion. The opening structure further includes an annular member disposed around the opening portion to be in contact with the overlapping portion and the cylindrical portion, and at least a recessed portion for receiving therein a part of the outer layer to be integrally connected with the opening portion. The annular member has a step portion formed inward of the annular member in a radial direction thereof to contact with at least the compressed portion.

Preferably, the recessed portion of the annular member includes a plurality of recesses which are formed to be opened in a direction opposite to a step surface of the step portion. Or, the recessed portion of the annular member may include a plurality of through holes formed on the step portion in the vicinity of the bent portion.

The bent portion may be formed with a lifted wall portion extending parallel with the side surface of the cylindrical portion.

A method for producing a fuel tank by forming a fuel tank wall with plastic layers including at least an outer layer, an inner layer and an intermediate layer, through blow molding, and forming an opening portion to be integral with the fuel tank wall may include a step of forming a cylindrical portion extended from the fuel tank wall outward thereof to form the opening portion, when the fuel tank wall is formed by blow molding, with an annular member placed around the opening portion. The annular member has a step portion formed inward in a radial direction thereof and at least a recessed portion for receiving therein a part of the outer layer to be integrally connected with the opening portion. The method further includes the steps of forming at least a part of the cylindrical portion to be bulged outward thereof in a radial direction thereof, to provide a bulged portion, pressing the bulged portion to form a bent portion bent at the outward of the opening portion in a radial direction thereof, to form an overlapping portion extended from an end of the cylindrical portion to form an outer surface parallel with an opening end surface of the opening portion, and compressing at least a portion of the overlapping portion on the step portion in a direction perpendicular to the opening end surface of the opening portion, to produce a compressed portion.

In the method as described above, the recessed portion of the annular member may include a plurality of recesses formed to be opened in a direction opposite to a step surface of the step portion, or a plurality of through holes formed on the step portion in the vicinity of the bent portion. The annular member may further include at least a leg portion which is integrally formed with the annular member to extend in the direction opposite to the step surface of the step portion, and which may be covered by a part of the outer layer of the opening portion.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
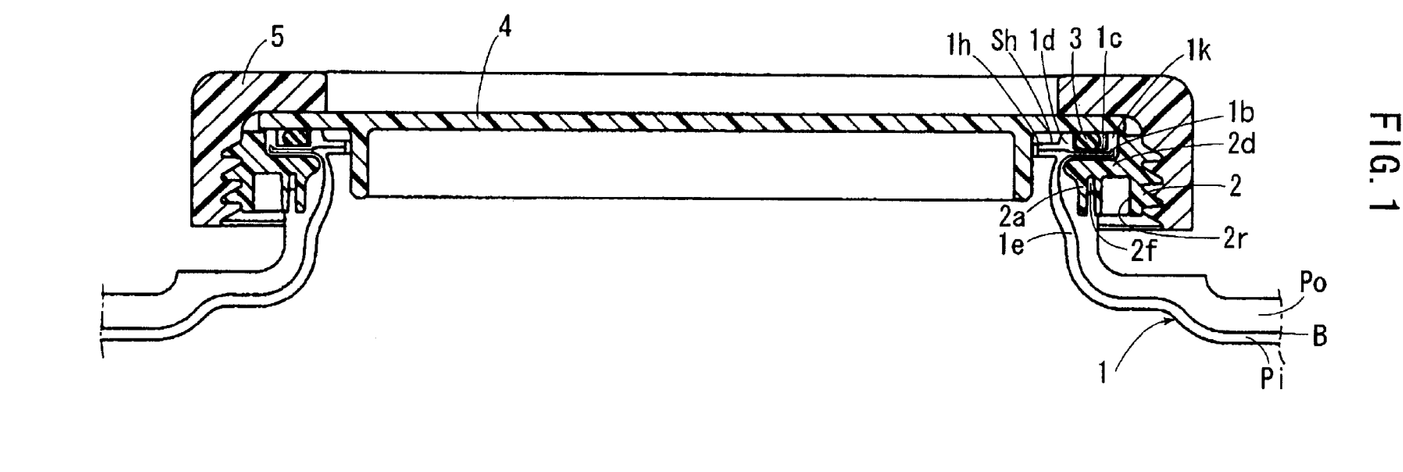
FIG. 1 is a cross sectional view of a part of an opening structure of a fuel tank according to an embodiment of the present invention.
Figure 2:
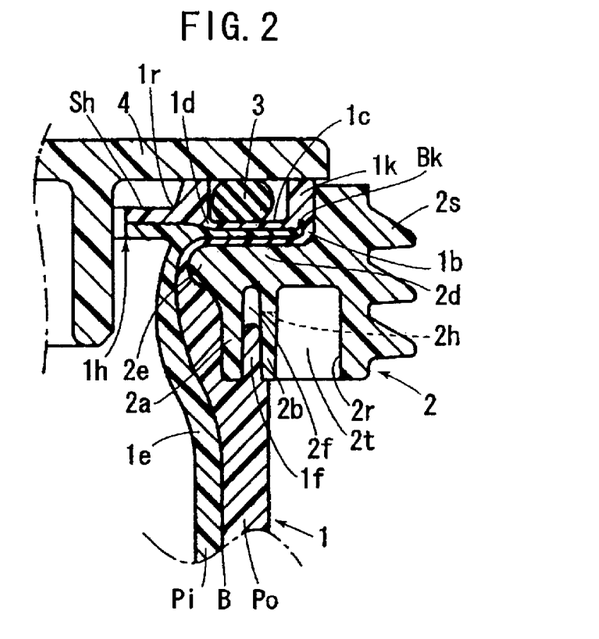
FIG. 2 is an enlarged cross sectional view of a part of an opening structure of a fuel tank according to an embodiment of the present invention.

Referring to FIG. 1, there is illustrated an opening structure of a fuel tank according to an embodiment of the present invention, a part of which is sectioned and enlarged in FIG. 2. According to the present embodiment, a fuel tank wall 1 is formed with a plastic member having plastic layers including at least an outer layer (Po), an inner layer (Pi) and an intermediate layer (B), through blow molding, and an opening portion 1$h$ is formed integrally with the fuel tank wall 1. A method for producing it will be explained later.

Figure 3:
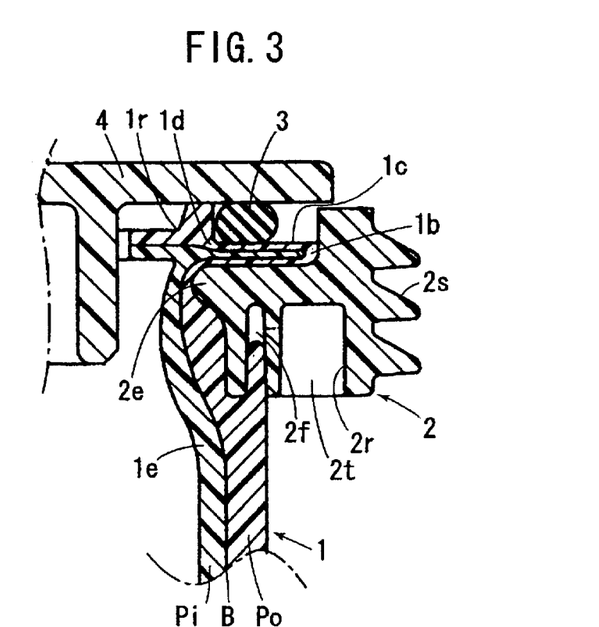
FIG. 3 is an enlarged cross sectional view of a part of an opening structure of a fuel tank according to another embodiment of the present invention.

As shown in FIGS. 1 and 2, in the vicinity of the opening portion 1$h$, there are formed a cylindrical portion 1$e$ which is extended from the fuel tank wall 1 outward thereof to form the opening portion 1$h$, and an overlapping portion 1$d$ which is extended from an end of the cylindrical portion 1$e$ to enlarge the diameter of the opening portion 1$h$ and bent at a bent portion 1$b$ to form an outer surface parallel with an opening end surface Sh of the opening portion 1$h$. And, at least a part of the overlapping portion 1$d$ is compressed in a direction perpendicular to the opening end surface Sh of the opening portion 1$h$, to form a compressed portion 1$c$. In FIG. 1, hatching to the plastic member constituting the fuel tank wall 1 is omitted to show the structure clearly, while its structure will be described later. According to the present embodiment, a lifted wall portion 1$k$ is formed to extend from the bent portion 1$b$ in parallel with the side surface of the cylindrical portion 1$e$, as shown in FIG. 2. Consequently, an annular groove is formed on the compressed portion 1$c$ at the inner side of the lifted wall portion 1$k$. On the contrary, as shown in FIG. 3, a step which is formed when the wall 1 is compressed, without forming the lifted wall portion 1$k$, may serve as the compressed portion 1$c$ to be opened outward. Furthermore, an annular step portion 1$r$ is formed at a side close to the opening portion 1$h$ against the groove. In other words, the compressed portion 1$c$ and the step portion 1$r$ are separated by a wall portion, as shown in FIGS. 2 and 3.

As illustrated in FIG. 2, the plastic member constituting the fuel tank wall 1 is the one with multiple layers, that includes the outer layer (Po) and the inner layer (Pi), both of which are formed by the strength holding member, and the intermediate layer (B) which is formed with the barrier material and disposed between them, to be bound together by adhesive plastics. As for the strength holding member employed in the present embodiment, ultra high polymeric (high density) polyethylene is used. As for the barrier material, EVOH (i.e., plastic with ethylene and vinyl-alcohol co-polymerized) is used, for example. According to the present invention, however, the materials are not limited to those as described above, but may be employed any materials which can prevent the fuel of gasoline or the like from being passed, to provide effective gas-barrier property.

According to the present embodiment, the bent portion 1b is bent inward (toward the opening) as apparent from an enlarged cross sectional view in FIG. 2, so that even if the fuel passed through the inner layer (Pi), it could be blocked by the intermediate layer (B) at the bent portion 1b, effectively. Particularly, the outermost end Bk of the intermediate layer (B) is formed to be bent at the outside of the compressed portion 1c toward the lifted wall portion 1k, so that the thickness of the outer layer (Po) is formed relatively thin, comparing with the thickness at the cylindrical portion 1e. Thus, the thickness of the outer layer (Po) is formed to be thin at the compressed portion 1c, so that the passage has been made narrow, thereby to provide a resistance when the fuel is introduced from an opening end surface of the opening portion 1h. On the contrary, according to the opening structure without the compressed portion 1c formed therein, the opening end surface (corresponding to an end surface of the portion as indicated by an arrow with "1h" in FIG. 2) of the plastic member with multiple layers can be directly communicated with the outer space. Therefore, even in the case where a seal member (corresponding to "3" in FIG. 2) was disposed between a cover member 4 and an annular securing member 5 (in FIG. 1), the fuel might pass through the outer layer (Po). Theoretically, some fuel might be introduced from the opening end surface of the opening portion 1h, to pass through the thin portion of the compressed portion 1c, and reach the bent portion 1b, according to the present embodiment, but the amount of fuel is so small as to be substantially negligible.

Figure 25:
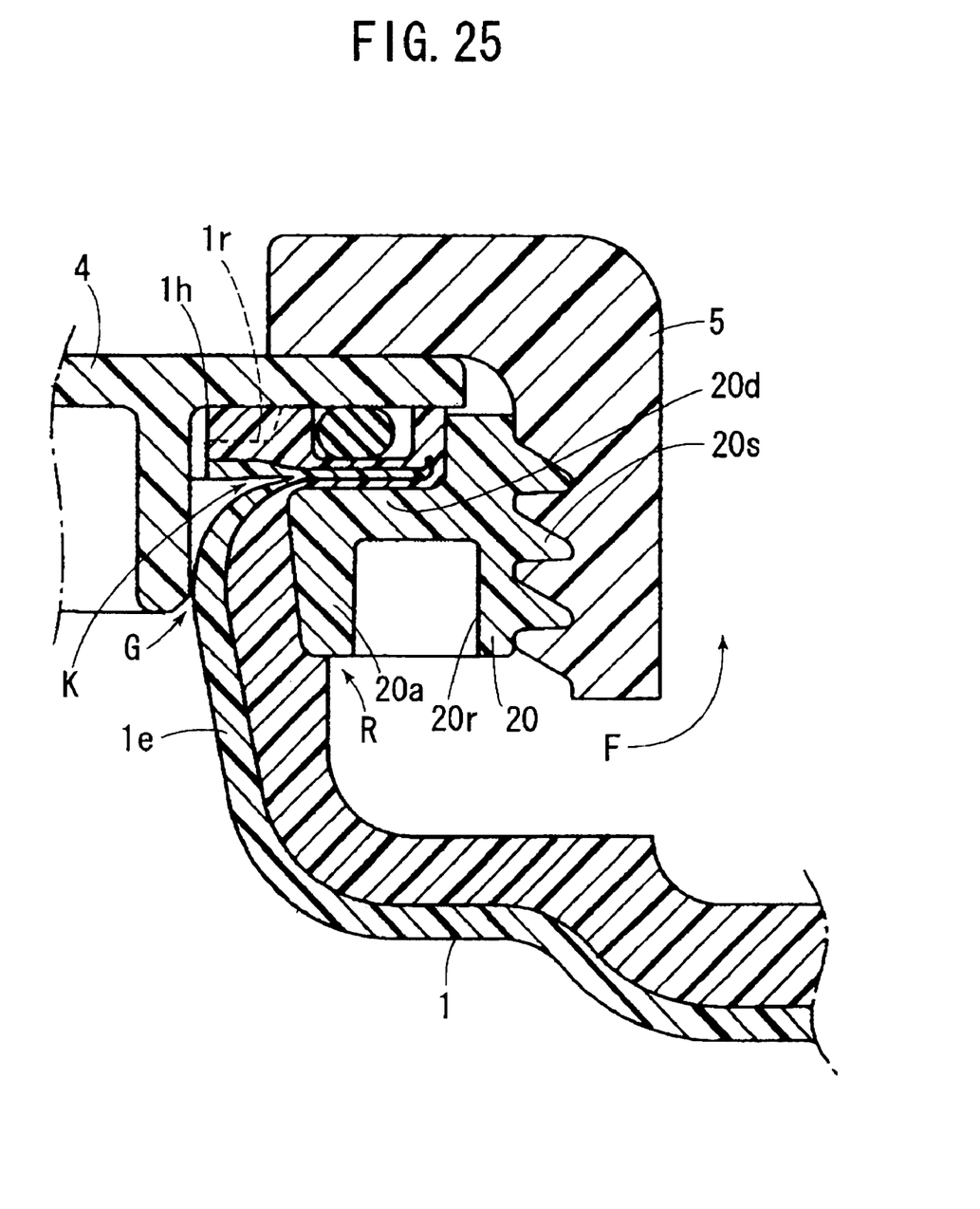
FIG. 25 is a cross sectional view of a part of an opening structure of a fuel tank according to a comparing example.

Furthermore, an annular member 2 is placed to surround the opening portion 1h, and fixed to the opening portion 1h, which is formed with the plastic member for forming the fuel tank 1. The annular member 2 is made of plastic, and formed at the inner side thereof with a step portion 2d, so that its inner side abuts on the outer side surface of the cylindrical portion 1e, and its step surface abuts on the lower surface of the compressed portion 1c and the bent portion 1b. Further, the annular member 2 abuts on the lifted wall portion 1k according to the present embodiment. A shoulder portion 2e is formed to extend in a radial direction along the inner periphery of the step portion 2d, so as to ensure a sufficient contacting area with the compressed portion 1c and retract its lower portion outwardly. In other words, an inner peripheral wall portion 2a of the annular member 2 is retracted at its lower portion from the inner peripheral end toward the outer peripheral end, relative to its upper portion. Referring to a comparing example as illustrated in FIG. 25, for example, when an annular member 20 is employed, an inner peripheral wall portion 20a extends to an inner peripheral end of a step portion 20d. Therefore, when the cylindrical portion 1e is formed, it extends inside of the opening portion 1h, so that its opening area is reduced to contact with a portion of the cover member 4 at a position as indicated by "G" in FIG. 25. According to the present embodiment, however, the inner peripheral wall portion 2a of the annular member 2 is retracted from the inner peripheral end toward the outer peripheral end, as shown in FIG. 2, so that a sufficient opening area can be ensured.

Figure 9:
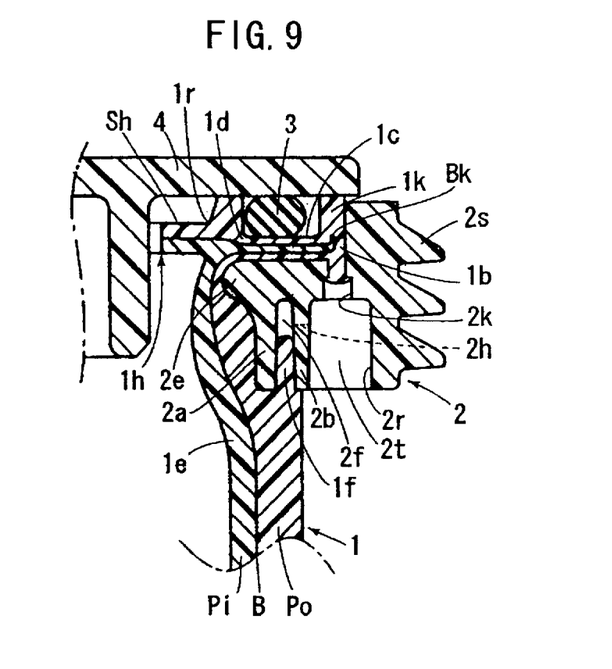
FIG. 9 is an enlarged cross sectional view of a part of an opening structure of a fuel tank according to a further embodiment of the present invention.
Figure 10:
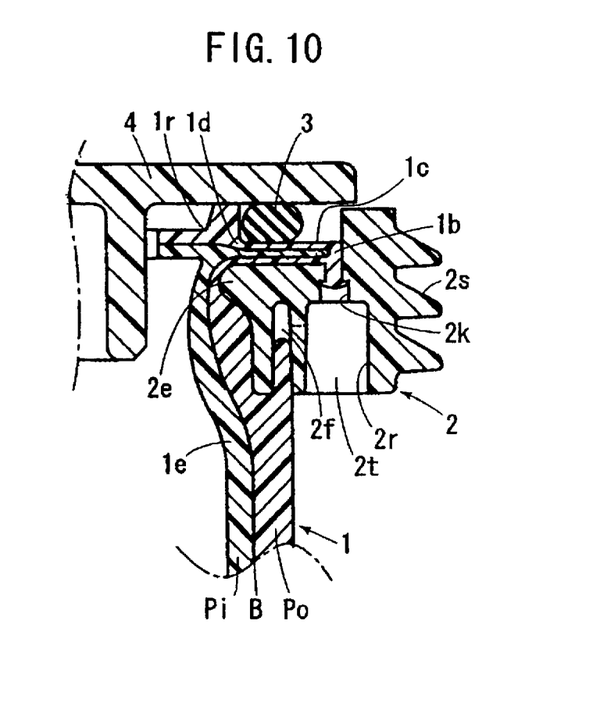
FIG. 10 is an enlarged cross sectional view of a part of an opening structure of a fuel tank according to a yet further embodiment of the present invention.

As shown in FIG. 2, recesses 2f and 2r are formed, with an intermediate wall 2b placed between them, at an opposite end (the lower end in FIGS. 1 and 2) to the upper surface of the step portion 2d. And, a threaded portion 2s is formed around the outer side surface of the annular member 2. The recess 2f is formed to open at the lower end as shown in FIG. 2. According to the present embodiment, the recess 2f is formed to open in a direction perpendicular to the surface contacting with the compressed portion 1c, while it may be formed in a direction crossing the contacting surface. Accordingly, when the cylindrical portion 1e is formed as described later, the plastic member is introduced into the recess 2f to form an engaging portion 1f, as described later, so that the annular member 2 is integrally connected with the cylindrical portion 1e, effectively. Furthermore, as shown in FIG. 9, a plurality of through holes 2k are formed to be evenly spaced between the neighboring holes along the periphery of the annular member 2, so that the plastic member is introduced into the holes 2k to connect the annular member 2 with the cylindrical member 1e integrally, thereby to prevent the annular member 2 from being rotated relative to the cylindrical portion 1e. FIG. 10 illustrates another embodiment which corresponds to the one without the lifted wall portion 1k as shown in FIG. 3, and which is formed with the through holes 2k.

Figure 4:
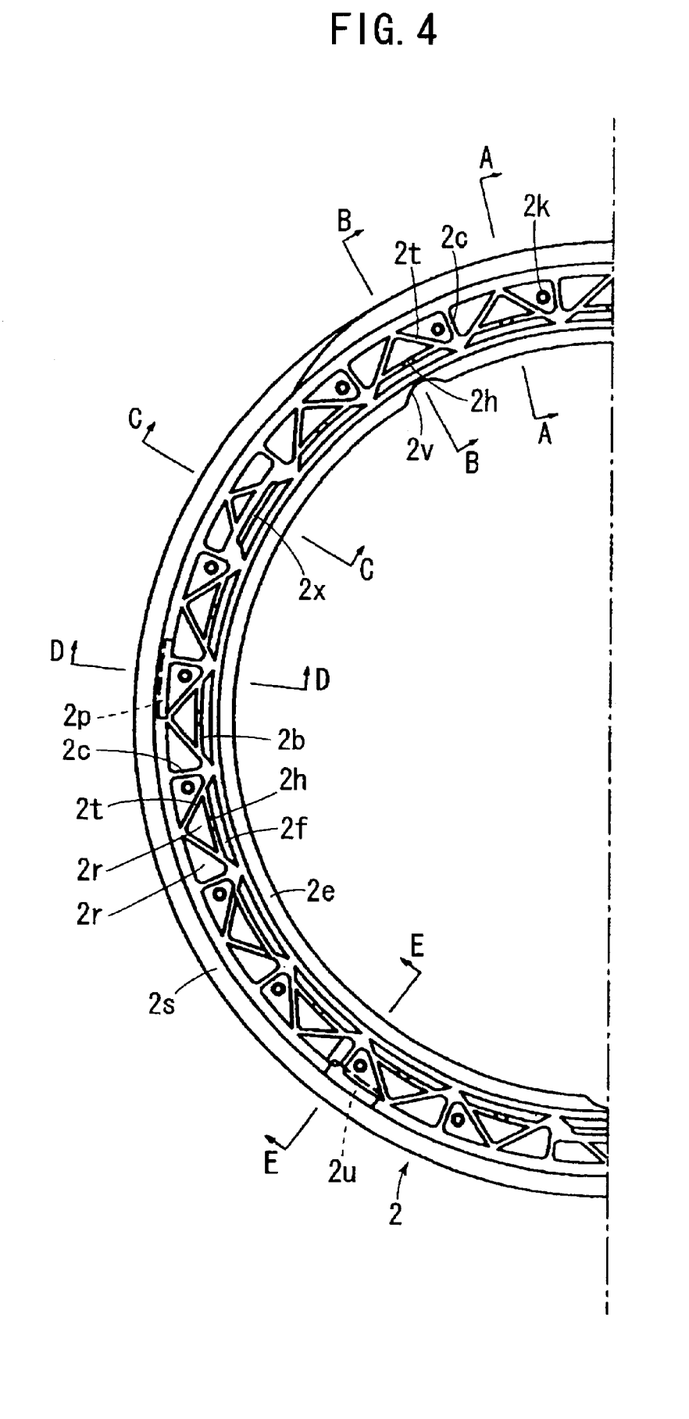
FIG. 4 is a plan view of an annular member for use in an opening structure of a fuel tank according to an embodiment of the present invention.
Figure 5:
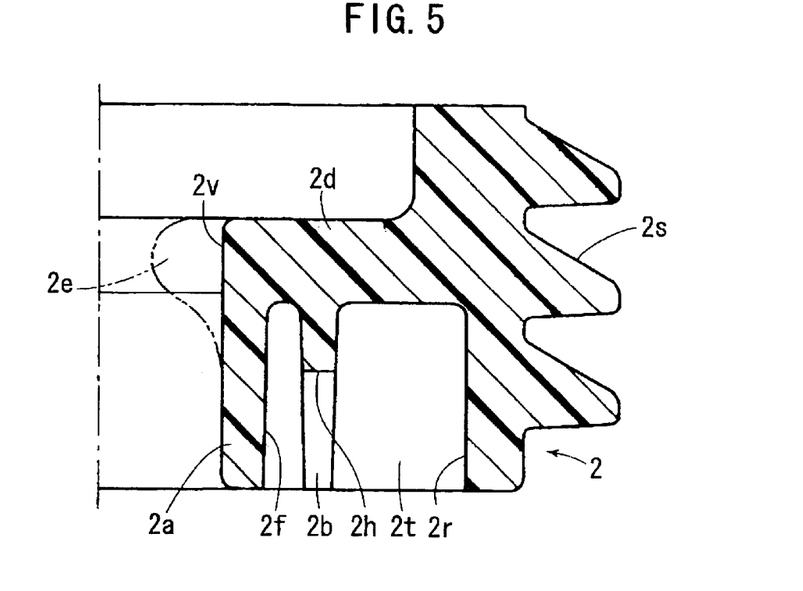
FIG. 5 is a cross sectional view of a part of the annular member sectioned along B—B line in FIG. 4.

Next will be described the annular member 2 in more detail, with reference to FIGS. 4–8. The recesses 2f and 2r are divided into a plurality of sections along the periphery of the annular member 2, as shown in FIG. 4. In other words, a plurality of recesses 2f and 2r are arranged in parallel with each other, along the periphery of the annular member 2. FIG. 4 illustrates a reverse side of the annular member 2, wherein there are formed a plurality of ribs 2c which extend in a radial direction, and a plurality of inclined ribs (or, truss) 2t which extend between the neighboring ribs 2c, and which form a series of angled ribs along the periphery according to a plan view. Thus, the recesses 2f and 2r are separated by the ribs 2c and the inclined ribs 2t, so that the stiffness of the annular member 2 is improved largely, comparing with the recesses 2f and 2r formed into a simple annular recess, respectively, thereby to strengthen the connection of the annular member 2 with the cylindrical portion 1e. Particularly, the inclined ribs 2t act as means for preventing torsion of the annular member 2, effectively. In FIG. 4, A—A line indicates a general cross section as shown in FIG. 2, and B—B line indicates a cross section as shown in FIG. 5. As apparent from FIGS. 4 and 5, the shoulder portion 2e of the annular member 2 is partially cut out to form notches 2v, which are adapted to receive setting pins (not shown) for placing the annular member 2 at a proper position. As indicated by a broken line in FIG. 2, through holes 2h are formed on the intermediate wall portion 2b to exhaust the air in the recesses 2f, in the case where the plastic member is introduced into the recesses 2f, when the cylindrical portion 1e is formed.

Figure 6:
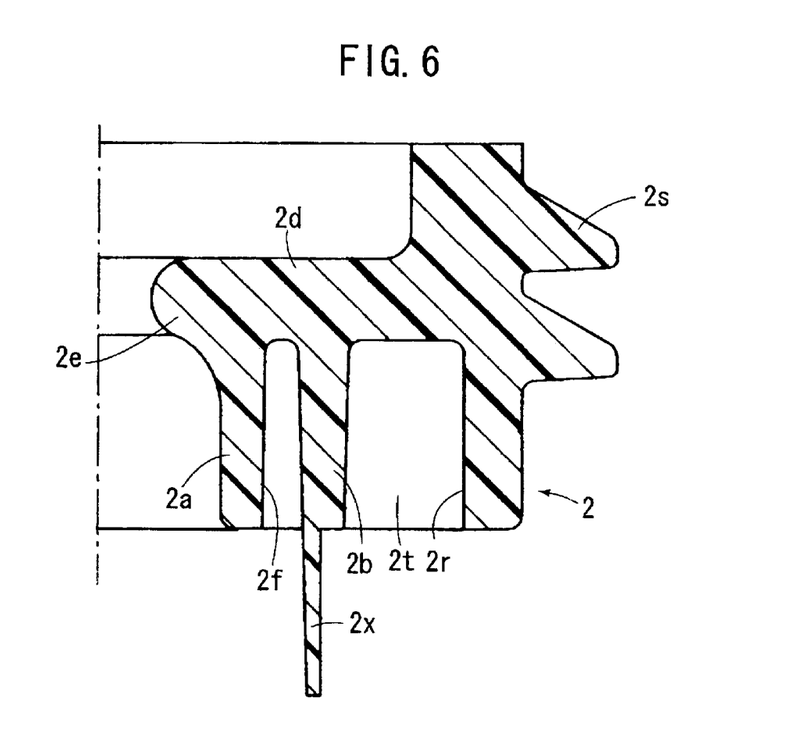
FIG. 6 is a cross sectional view of a part of the annular member sectioned along C—C line in FIG. 4.

FIG. 6 is a cross sectional view sectioned along C—C line in FIG. 4. As shown in FIGS. 4 and 6, leg portions 2x are formed at the reverse side of the annular member 2 to extend from the intermediate wall portion 2b. The leg portions 2x are formed at a plurality of positions (e.g., 3 positions) evenly spaced along the periphery of the annular member 2, to be grasped by a chuck of a robot (not shown) for transferring and positioning the annular member 2. Furthermore, by means of the leg portions 2x, a plurality of annular members 2 can be stacked properly one over another, without interfering with one another, so that the annular members 2 can be supplied easily and timely when manufacturing the fuel tank.

Figure 7:
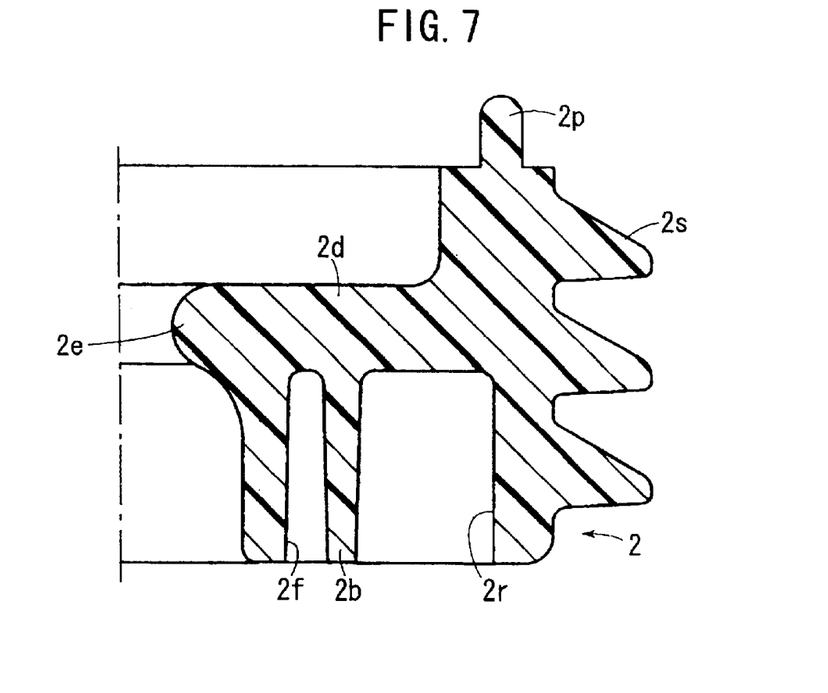
FIG. 7 is a cross sectional view of a part of the annular member sectioned along D—D line in FIG. 4.
Figure 8:
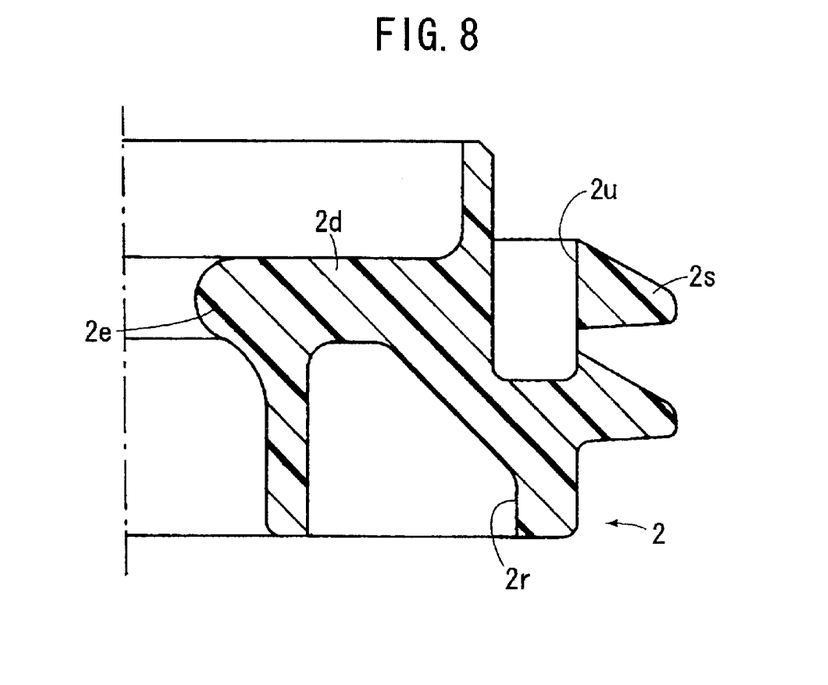
FIG. 8 is a cross sectional view of a part of the annular member sectioned along E—E line in FIG. 4.

FIG. 7 is a cross sectional view sectioned along D—D line in FIG. 4. As shown in FIGS. 4 and 7, protrusions 2p are formed to extend from the upper end of the annular member 2. The protrusions 2p are formed at a plurality of positions (e.g., 3 positions) evenly spaced along the periphery of the annular member 2, to prevent the cover member 4 as shown in FIGS. 1 and 2 from being dislocated, when installing the cover member 4. FIG. 8 is a cross sectional view sectioned along E—E line in FIG. 4. As shown in FIGS. 4 and 8, a recess 2u is formed on the upper surface of the annular member 2, and adapted to be engaged with a protrusion (not shown) formed on the cover member 4 to prevent the cover member 4 from being rotated, when securing the cover member 4.

The opening portion 1h as constituted above has the compressed portion 1c to provide an annular groove, which receives an annular sealing member 3 made of rubber or the like as shown in FIG. 1. Therefore, after the cover member 4 is placed on the sealing member 3, the securing member 5 having a threaded portion inside thereof is mounted on the cover member 4, and engaged with the threaded portion 2s of the annular member 2. Consequently, the cover member 4 is tightly secured to the upper surface of the compressed portion 1c through the sealing member 3.

Referring to the comparing example as shown in FIG. 25, if a relatively large force is applied to the securing member 5 in a direction as indicated by "F" in FIG. 25, an annular member 20 might be removed from the cylindrical portion 1e at a position as indicated by "R" in FIG. 25, depending upon the plastic material forming the securing member 5. According to the present embodiment, however, the annular member 20 and the cylindrical portion 1e are connected integrally by the engaging portion 1f and the recess 2f. Therefore, even if the large force was applied to the securing member 5 as described above, the annular member 20 would not be removed from the cylindrical portion 1e.

According to the present embodiment as described above, portions through which the fuel in the tank may be communicated with the outside of the tank, are only the portions where the sealing member 3 abuts on the cover member 4 and the compressed portion 1c, and the portion where the outer layer (Po) out of the multiple layers was formed, is relatively thin, and particularly, the outermost end Bk of the intermediate layer (B) is placed outside of the compressed portion 1c, when the compressed portion 1c was formed. As a result, the fuel is effectively prevented from passing through the opening portion of the fuel tank wall 1. Furthermore, a good sealing property can be ensured, because a profile irregularity has been improved to provide a smooth surface on the bottom surface of the compressed portion 1c.

Figure 13:
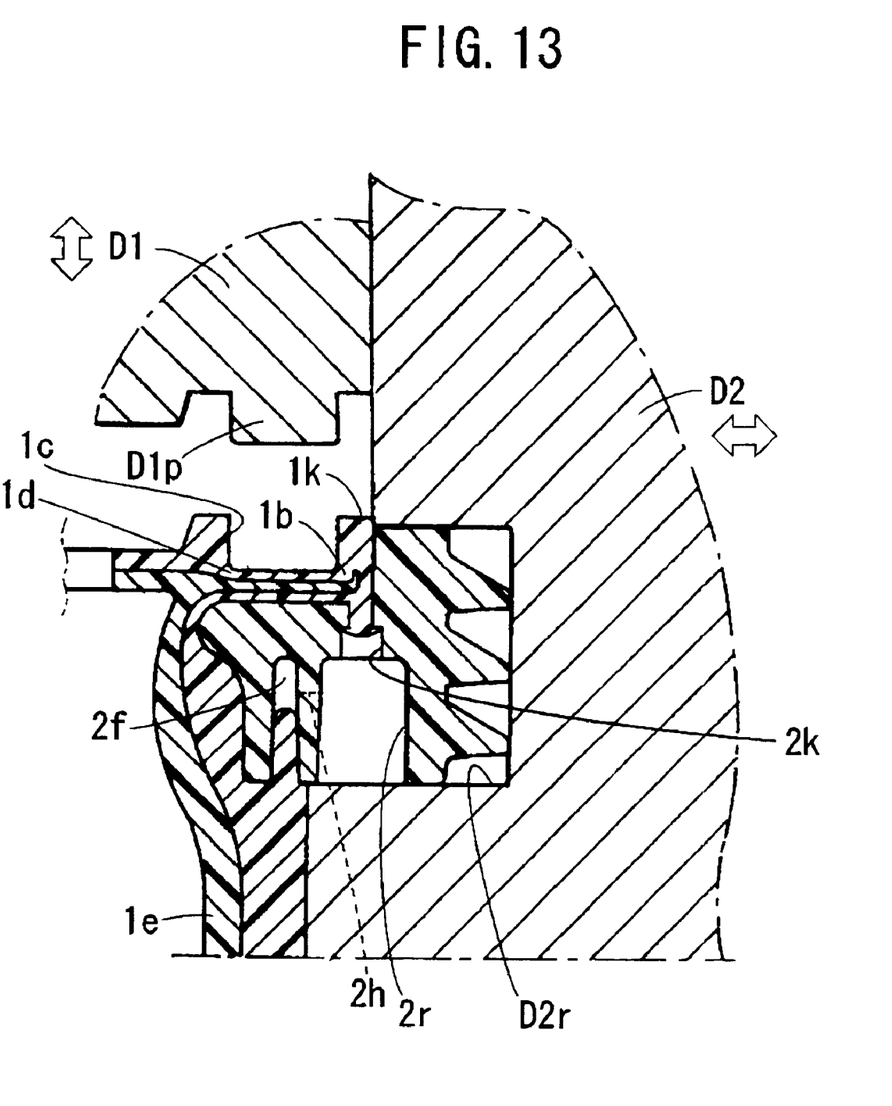
FIG. 13 is an enlarged cross sectional view of a part of dies for forming an opening structure of a fuel tank according to an embodiment of the present invention.

FIG. 13 illustrates dies for use in producing the fuel tank having the above-described opening structure. As shown in FIG. 13, a die D1 is supported to move vertically (up and down in FIG. 13), while a die D2 is supported to move horizontally. The dies D1 and D2 are formed insides thereof with a protrusion D1p and a recess D2r, respectively. The protrusion D1p is formed to provide the compressed portion 1c as shown in FIG. 2, and the recess D2r is formed to receive the threaded portion 2s of the annular member 2. FIG. 13 illustrates the formed or finished opening portion 1h of the fuel tank wall 1 as shown in FIG. 9.

Figure 14:
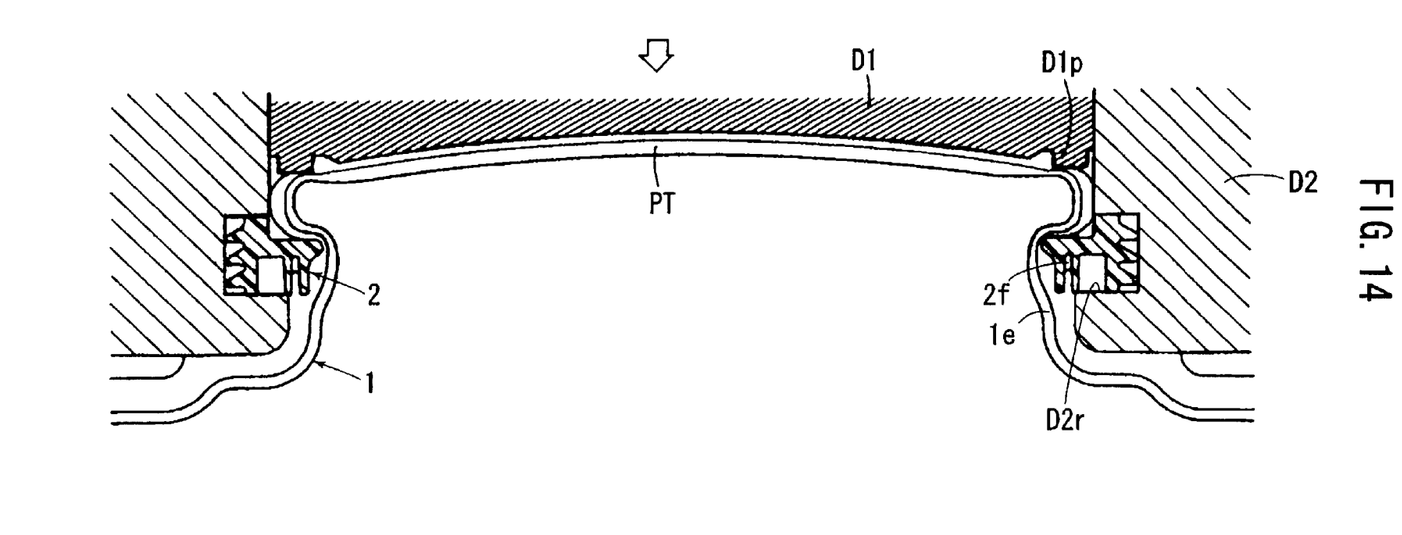
FIG. 14 is a cross sectional view illustrating a bulging step for forming an opening structure of a fuel tank according to an embodiment of the present invention.
Figure 15:
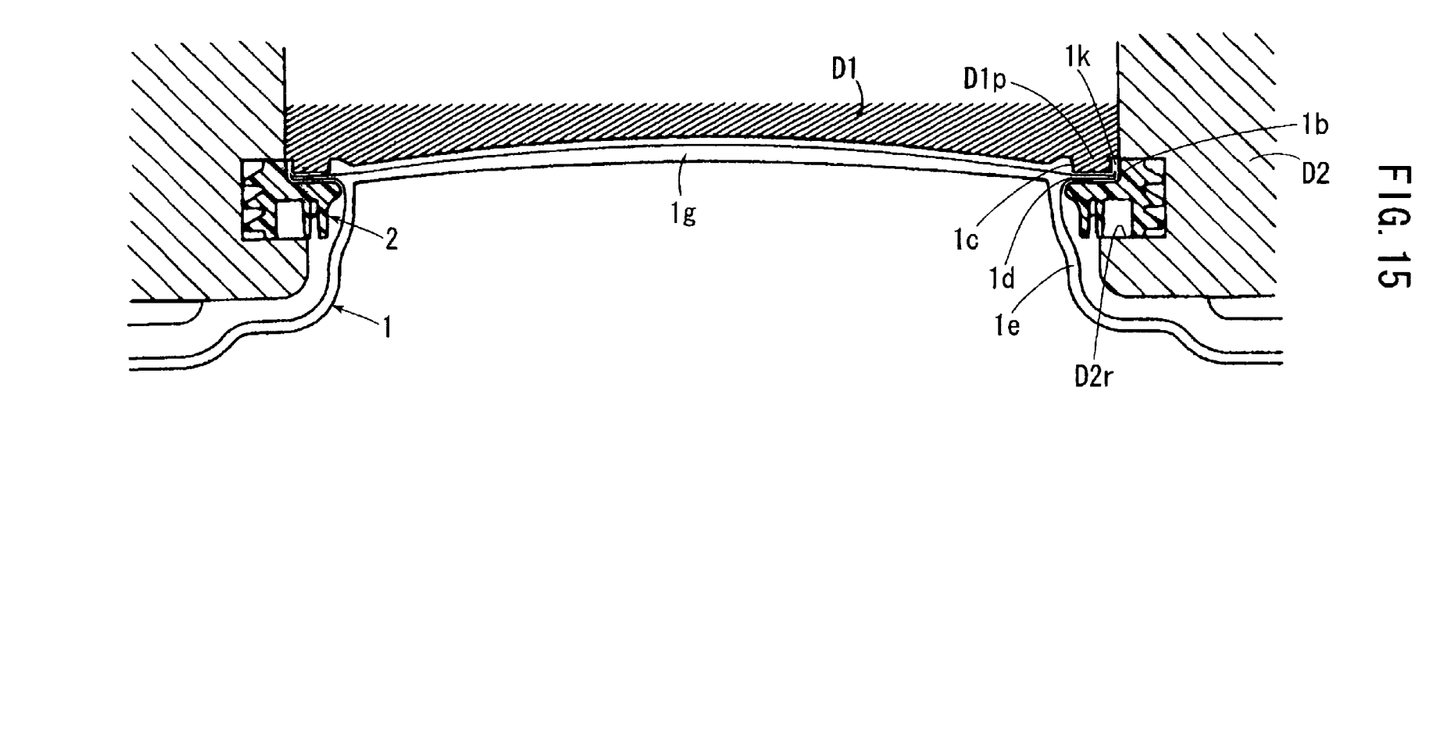
FIG. 15 is a cross sectional view illustrating a compressing step for forming an opening structure of a fuel tank according to an embodiment of the present invention.

FIGS. 14 and 15 illustrate an example of a process for producing the fuel tank having the opening structure as described above. At the outset, according to a forming process as shown in FIG. 14, placed between dies D1 and D2 is a multi-layer parison PT made of the plastic member with multiple layers (three layers in this embodiment). And, it is so arranged that the air pressure or hydraulic pressure is supplied into the multi-layer parison PT through a conduit (not shown).

Figure 11:
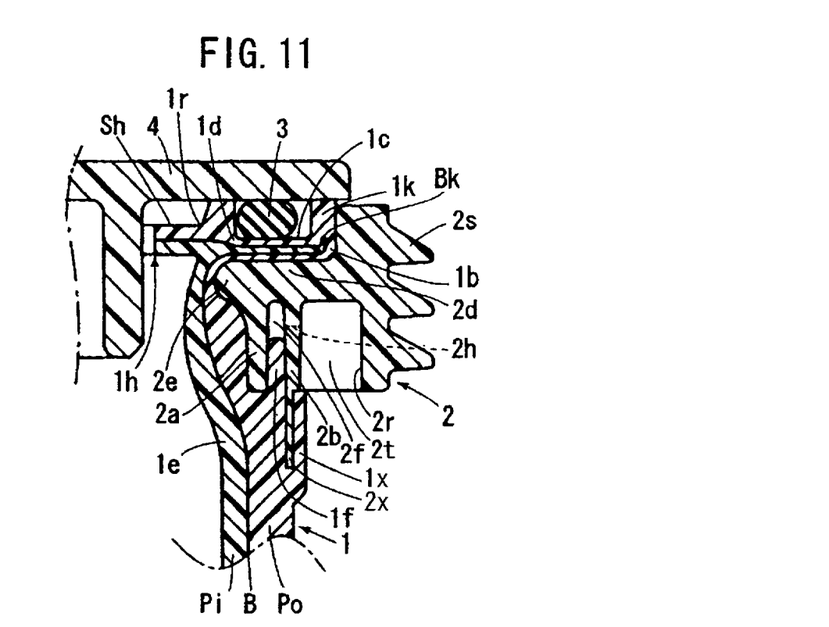
FIG. 11 is an enlarged cross sectional view of a part of an opening structure of a fuel tank according to a further embodiment of the present invention.
Figure 12:
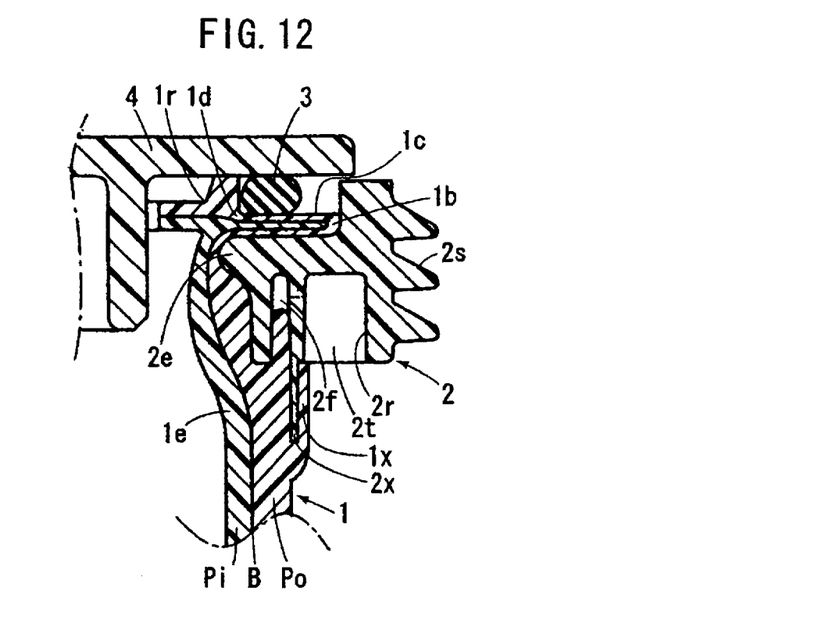
FIG. 12 is an enlarged cross sectional view of a part of an opening structure of a fuel tank according to a yet further embodiment of the present invention.

Accordingly, with the air pressure or hydraulic pressure introduced into the multi-layer parison PT, the die D1 is moved relative to the die D2 toward the annular member 2 as indicated by a blank arrow in FIG. 14. As a result, the multi-layer parison PT is bulged outwardly as shown in FIG. 14, while the portion abutting on the annular member 2 is restricted from being bulged outwardly to form the cylindrical portion 1e. Then, the bent portion 1b and the overlapping portion 1d are formed accurately, as shown in FIG. 15. Also, the overlapping portion 1d is compressed by the protrusion D1p of the die D1 to form the compressed portion 1c and the lifted wall portion 1k. At the same time, the plastic member is introduced into the through holes 2k (in FIGS. 9 and 13), and the recesses 2f (in FIG. 11) of the annular member 2, whereby the annular member 2 is connected with the cylindrical portion 1e integrally. In this case, the air in the recesses 2f is exhausted from the through holes 2h as indicated by the broken line in FIGS. 9 and 11. Also formed is a cover portion 1g as shown in FIG. 15, which will be removed later. As a result, the opening portion of the fuel tank is formed as shown in FIGS. 9, 11 and 13, and the annular member 2 is connected integrally with the cylindrical portion 1e, effectively.

In the process for forming the opening portion as described above, the step portion 1r and the through holes 2k as shown in FIG. 9 are formed to adjust the amount of plastic material, so as to provide a desired configuration of the finished product. According to the example as shown in FIG. 25, the step portion 1r and through holes 2k are not formed. If the step portion 1r as indicated by a broken line in FIG. 25, is not formed, the amount of plastic material at a portion as indicated by "K" in FIG. 25 will be consumed by the portion to be formed with the step portion 1r, so that the inner corner (indicated by "K") of the opening portion will extend outward in a radial direction. On the contrary, if the step portion 1r is formed as in the present embodiment, the amount of plastic material to be consumed by a portion cut out for forming the step portion 1r can be ignored, so that an appropriate inner corner will be formed, as indicated by a broken line in FIG. 25. Furthermore, the recesses 2k are adapted to adjust the amount of plastic material, so that a difference between the amount of plastic material before the compressing process is performed and the amount of plastic material after the compressing process was performed will be approximately equal to the sum of the amount of plastic material introduced into the recesses 2k and the amount of plastic material forced to move in a radial direction toward the center of the opening portion. Thus, the recesses 2k act as means for preventing the annular member 2 from being rotated relative to the cylindrical portion 1e, and means for properly adjusting the amount of plastic material, when forming the opening portion.

Figure 16:
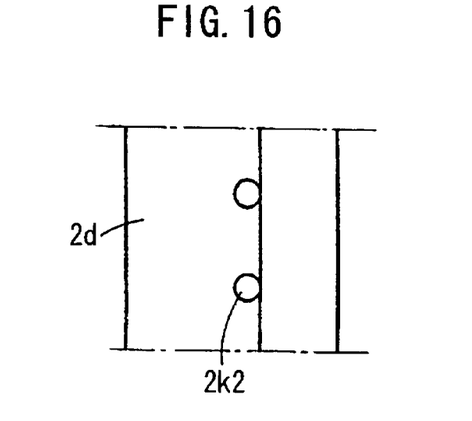
FIG. 16 is a plan view of a part of an annular member according to an embodiment of the present invention.
Figure 17:
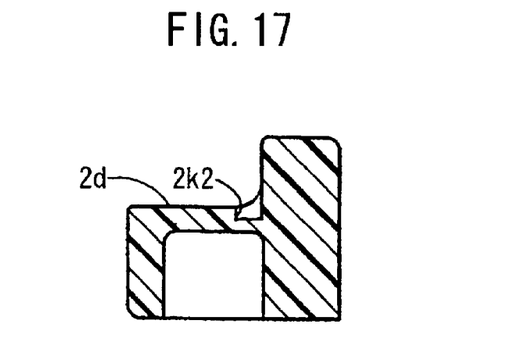
FIG. 17 is a cross sectional view of a part of an annular member according to a further embodiment of the present invention.
Figure 18:
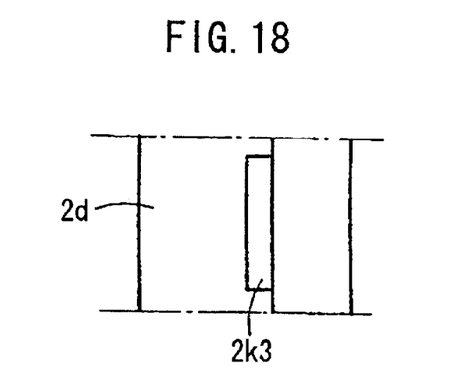
FIG. 18 is a plan view of a part of the annular member according to the embodiment as shown in FIG. 17.

FIGS. 16 and 17 illustrate another embodiment of the annular member 2 which is formed with recesses 2k2 on the step portion 2d, instead of the through holes 2k as shown in FIG. 9. In this embodiment, a peripheral corner of the step portion 2d is formed to provide a smoothly curved surface as shown in FIG. 17. The recesses 2k2 may be substituted by elongated recesses 2k3 as shown in FIG. 18, with the same cross sectional view as shown in FIG. 17.

Figure 19:
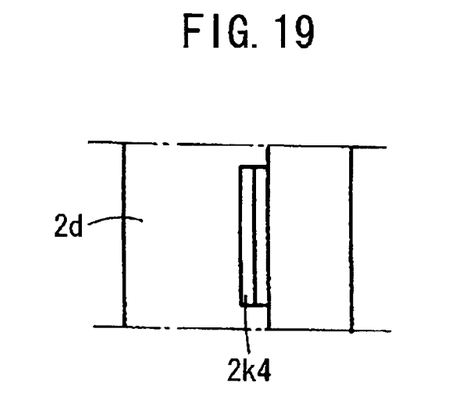
FIG. 19 is a plan view of a part of an annular member according to a further embodiment of the present invention.
Figure 20:
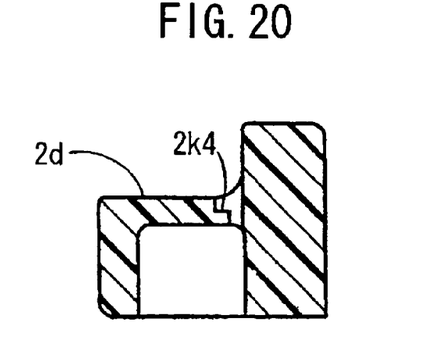
FIG. 20 is a cross sectional view of a part of the annular member according to the embodiment as shown in FIG. 19.
Figure 21:
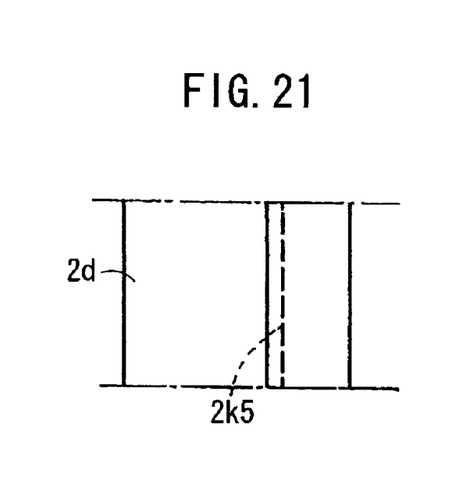
FIG. 21 is a plan view of a part of an annular member according to a further embodiment of the present invention.
Figure 22:
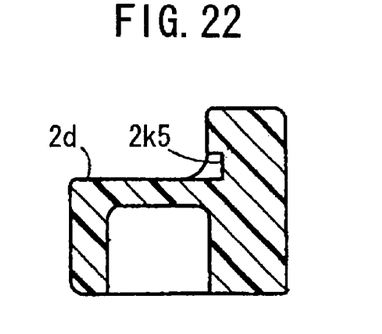
FIG. 22 is a cross sectional view of a part of the annular member according to the embodiment as shown in FIG. 21.
Figure 23:
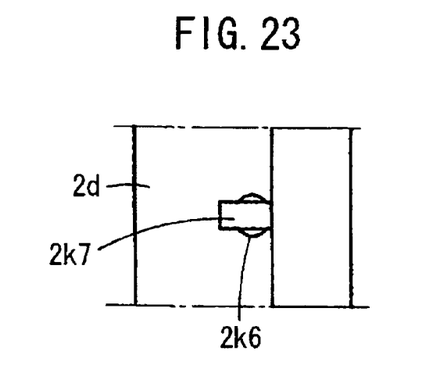
FIG. 23 is a plan view of a part of an annular member according to a further embodiment of the present invention.
Figure 24:
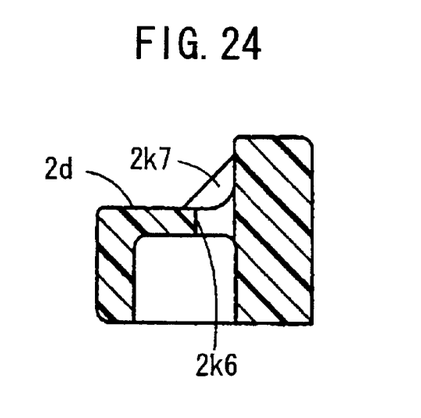
FIG. 24 is a cross sectional view of a part of the annular member according to the embodiment as shown in FIG. 23.

FIGS. 19 and 20 illustrate a further embodiment of the annular member 2 which is formed with stepped and elongated through holes 2k4 on the step portion 2d, instead of the through holes 2k as shown in FIG. 9. FIGS. 21 and 22 illustrate a yet further embodiment of the annular member 2 which is formed with recesses 2k5 in a radial direction of the annular member 2, instead of the through holes 2k as shown in FIG. 9. FIGS. 23 and 24 illustrate a yet further embodiment of the annular member 2 which is formed with through holes 2k6 and integrally formed with ribs 2k7 to extend over the through holes 2k6, instead of the through holes 2k as shown in FIG. 9.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An opening structure of a fuel tank having a fuel tank wall made of plastic layers including at least an outer layer, an inner layer and an intermediate layer, with an opening portion formed to be integral with said fuel tank wall, comprising:

a cylindrical portion extended from said fuel tank wall outward thereof to form said opening portion;

an overlapping portion extended from an end of said cylindrical portion to enlarge the diameter of said opening portion and bent at a bent portion to form an outer surface parallel with an opening end surface of said opening portion;

a compressed portion with at least a portion of said overlapping portion compressed in a direction perpendicular to the opening end surface of said opening portion; and an annular member disposed around said opening portion to be in contact with said overlapping portion and said cylindrical portion, said annular member having a step portion formed inward of said annular member in a radial direction thereof to contact with at least said compressed portion, and at least a recessed portion for receiving therein a part of said outer layer to be integrally connected with said opening portion.

2. The opening structure of the fuel tank according to claim 1, wherein said recessed portion of said annular member includes a plurality of recesses formed to be opened in a direction opposite to a step surface of said step portion.

3. The opening structure of the fuel tank according to claim 2, wherein said annular member includes a plurality of ribs integrally formed with said annular member in the vicinity of said recesses to extend in the direction opposite to the step surface of said step portion, along the whole periphery of said annular member.

4. The opening structure of the fuel tank according to claim 2, wherein said annular member further includes at least a leg portion integrally formed with said annular member to extend in the direction opposite to the step surface of said step portion, and contact with said outer layer of said opening portion.

5. The opening structure of the fuel tank according to claim 4, wherein said leg portion is covered by a part of said outer layer of said opening portion.

6. The opening structure of the fuel tank according to claim 1, wherein said recessed portion of said annular member includes a plurality of through holes formed on said step portion in the vicinity of said bent portion.

7. The opening structure of the fuel tank according to claim 6, wherein said annular member further includes at least a rib integrally formed with said annular member to extend over at least one of said through holes.

8. The opening structure of the fuel tank according to claim 1, wherein said recessed portion is formed in a radial direction of said annular member.

9. The opening structure of the fuel tank according to claim 1, wherein said bent portion is formed with a lifted wall portion extending parallel with the side surface of said cylindrical portion.

10. The opening structure of the fuel tank according to claim 1, wherein said compressed portion provides an annular groove placed outward of said opening portion in a radial direction of said cylindrical portion, and wherein an inner step portion is formed to extend from said overlapping portion inward of said annular groove in a radial direction of said cylindrical portion.

11. A method for producing a fuel tank by forming a fuel tank wall with plastic layers including at least an outer layer, an inner layer and an intermediate layer, through blow molding, and forming an opening portion to be integral with said fuel tank wall, comprising:

forming a cylindrical portion extended from said fuel tank wall outward thereof to form said opening portion, when said fuel tank wall is formed by blow molding, with an annular member placed around said opening portion, said annular member having a step portion formed inward in a radial direction thereof and at least a recessed portion for receiving therein a part of said outer layer to be integrally connected with said opening portion;

forming at least a part of said cylindrical portion to be bulged outward thereof in a radial direction thereof, to provide a bulged portion;

pressing said bulged portion to form a bent portion bent at the outward of said opening portion in a radial direction thereof, to form an overlapping portion extended from an end of said cylindrical portion to form an outer surface parallel with an opening end surface of said opening portion; and compressing at least a portion of said overlapping portion on said step portion in a direction perpendicular to the opening end surface of said opening portion, to produce a compressed portion.

12. The method according to claim 11, wherein said recessed portion of said annular member includes a plurality of recesses formed to be opened in a direction opposite to a step surface of said step portion.

13. The method according to claim 11, wherein said annular member further includes at least a leg portion integrally formed with said annular member to extend in the direction opposite to the step surface of said step portion, and contact with said outer layer of said opening portion, and wherein said leg portion is covered by a part of said outer layer of said opening portion.

14. The method according to claim 11, wherein said recessed portion of said annular member includes a plurality of through holes formed on said step portion in the vicinity of said bent portion.

15. The method according to claim 11, wherein said bent portion is formed with a lifted wall portion extending parallel with the side surface of said cylindrical portion.

* * * * *